Patented Jan. 11, 1927.

1,614,171

UNITED STATES PATENT OFFICE.

AUGUST AMANN AND EWALD FONROBERT, OF WIESBADEN, GERMANY, ASSIGNORS TO THE FIRM CHEMISCHE FABRIKEN DR. KURT ALBERT, G. M. B. H., OF AMONE-BURG, NEAR BIEBRICH-ON-THE-RHINE, GERMANY.

METHOD OF MAKING CONDENSATION PRODUCTS FROM MONO- AND DICYCLIC PHENOLS AND ALDEHYDES.

No Drawing. Application filed December 13, 1923, Serial No. 680,543, and in Germany November 1, 1921.

The invention relates to the production of crystalline and relatively thinly liquid condensation products from mono- and dicyclic phenols and aliphatic aldehydes.

The production of phenol alcohols by the treatment of phenols with formaldehyde in the presence of alkali is known. Generally the procedure either is such that the phenol, aldehyde, and alkali are mixed together or that the aldehyde is slowly added to the phenol which has been previously mixed with the alkali. In most cases a mixture of mono-, di- and poly-alcohols are at once formed even if only 1 molecule of aldehyde is employed for 1 molecule of phenol, and also mono-, di- and poly-alcohols are formed together if 2 molecules of aldehyde are employed for 1 molecule of phenol. If the reaction is not moderated directly by cooling or the like, dihydroxy diphenyl methane derivatives or higher molecular compounds of resinous character are formed as by-products from the first formed alcohols by their combination with fresh phenol molecules. The multiformity of the reaction may be recognized from the following scheme:

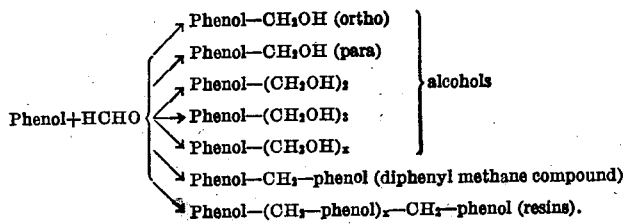

We have found that it is possible to obtain substantially quantitative yields of those products which are regarded to be the reaction products with the highest possible quantity of aldehyde and that this is possible without the formation of a relatively great amount of by-products of other kinds or even of resin like impurities if we proceed not in such manner that the phenols are at once brought together with the required quantity of an aliphatic aldehyde and that the reaction then is attempted to be accelerated by heating, but in such manner that the required quantity of a phenol is brought together with or added to such quantities of an aldehyde that the aldehyde will be present in excess during the reaction, care being taken at the same time to maintain a uniformly low temperature. Thereby the result is obtained on the one hand that the phenol always immediately finds such a quantity of aldehyde groups that it can combine fully with the greatest possible quantity thereof and on the other hand that any formation of resins is prevented in consequence of the very low temperature during the reaction (it is possible to work at the temperature of the room or while cooling). In this manner phenol polyalcohols are formed which are comparatively constant and lasting and which consequently will convert into resinous bodies under quite certain conditions that can exactly be determined.

In practising the invention we can proceed in such a manner that the phenol body either is added to or introduced in the whole quantity of the aldehyde to be employed, all at once, or progressively by degrees, at least one and a half molecule of the aldehyde being used for one molecule of the phenol body. When employing a great excess of aldehyde the danger of local heating of the mass during the reaction is highly diminished or removed even if the whole quantity of the phenol body is added all at once.

In all cases nearly pure or—where phenol mixtures are employed—correspondingly pure polyalcohol masses are obtained as final products. In cases where the formation of one determined alcohol alone or nearly alone is possible the final product can be brought to crystallization; in other cases very thinly liquid oils are formed even if for one molecule of the phenol body only one and a half molecules of the aldehyde is employed, or only a small excess over this quantity, said thinly liquid oils consisting of the corresponding polyalcohols with the highest possible contents in aldehyde.

In this manner it is possible to obtain directly crystallized p-cresol dialcohol in approximately the quantitative yield if pure p-cresol is employed, and to obtain a relatively very thinly liquid mixture of the different existing cresol polyalcohols if raw tricresol is employed, said liquid mixture containing only small quantities of resinified products even if an excess of aldehyde is used.

The purification of the polyalcohol mixtures by washing them with water can easily be performed in consequence of their thinly liquid state.

We further have found that the products which have been formed by reaction of phenols or cresols with the highest possible quantity of aldehyde show a more or less great degree of solubility in water, and that it is possible to obtain aqueous solutions of the polyalcohols free of alkali and of materials which will show ash if hydroxides of the alkali earth metals, preferably hydroxide of barium, are employed as solvents for the phenols, the barium being quantitatively precipitated by sulphuric acid or carbonic acid after the reaction is finished and the aqueous solution then being separated from the precipitate of the barium salt by filtration.

It is easily possible to obtain oily alcohol mixtures which are approximately free of ash and are especially well adapted for later employment for electrotechnical purposes. If the oily masses are directly worked up with filling materials, the use of all expensive and partly dangerous solvents may easily and almost totally be avoided in consequence of the fact that said oily masses are highly liquid.

As phenols all aromatic bodies may be employed which contain at their nucleus one or more reactive hydroxyl groups, as for instance phenol, all cresols, xylenol, naphthol and so on, also compounds containing two phenol rings as the condensation products from phenols with acetaldehyde, acetone and the like, e. g. diphenylolethane, diphenylol propane and the like. The phenols may be added in liquid state directly to the aldehyde, but they may also be previously dissolved in any suitable solvent. As alkali catalytically favours the production of the phenol alcohols it is advisable to dissolve the phenols with the smallest possible quantity of a solution of an alkali and to employ these solutions for the reaction. If much alkali is used then care is to be taken under certain circumstances that the mass is cooled during the mixing operation as considerable elevations of temperature may take place which however are to be avoided with respect to a favourable formation of the alcohols.

As aldehydes besides formaldehyde also other aliphatic aldehydes may be used, especially acetaldehyde.

The polyalcohols formed according to the method of the present invention are to be employed in all such cases where formaldehyde or the like is required in a highly reactive form and where the residue remaining after the splitting off of the formaldehyde or the like from the phenol polyalcohols, which may be either alcohol like or already resinous or even hard and infusible, will favour or at least will not disturb the properties of the desired final product. It is for this reason that the phenol polyalcohols and their mixtures are particularly suitable for the production of definite synthetic resins and resin mixtures.

The formaldehyde used in excess is not lost. It is either regained directly in a serviceable state in the distillation or in the separation of the oily and watery phase and then may be concentrated if desired by evaporation or by other methods and be freed of alkali if necessary, or it is contained as surplus formaldehyde in the final products and may be combined there in any suitable manner. This combining may be made as well by inorganic means, e. g. ammonia, as by any organic bodies which are capable of combining with formaldehyde, such as aniline, urea, pyridine and so on. Under certain circumstances it may be advisable to add fresh quantities of monocyclic phenols or dicyclic phenols, e. g. diphenylol propane to combine with the surplus aldehyde present. The conditions of treatment may be changed within broad limits, depending upon the purpose for which the phenol alcohol is to be used, and those substances may be added for binding the aldehyde which will form formaldehyde products of the kind desired in the final product.

A few examples of our new method are stated herewith:

Example 1.

One gram-molecule of p-cresol is dissolved by the minimum required quantity of a caustic soda solution of about 10% content and this solution is gradually added to 2 gram-molecules of formaldehyde (of 30%). After the mass has stood for several days all formaldehyde is combined. Upon acidulating with a weak acid as for instance with carbonic acid, acetic acid or the like the p-cresoldialcohol is immediately obtained in beautiful crystals which may be further cleansed in the usual manner. In many cases, the proportion of caustic soda solution being of importance in this respect, a great part of the p-cresoldialcohol already crystallizes before the acidulation.

The yield is a nearly quantitative one if those quantities which are retained by the washing waters are included. Nearly no by-products are formed. The yield of crystallized product goes up to 98% of the theoretical one. The remaining 2% probably are impurities of the p-cresol. In so far as these impurities consist of other cresols they also yield cresol alcohols which however are thinly liquid and oily. These products though they are not so pure as the crystallized p-cresoldialcohol very nearly resemble this body in their properties and may be employed for the same purposes.

*Example 2.*

1 gram-molecule of raw cresol with an average molecular weight of about 108 is brought into reaction with 2 gram-molecules of formaldehyde as indicated in example 1. Depending upon whether the reaction is performed while carefully cooling or only at ordinary temperature a quite thinly liquid or a somewhat more thickly liquid oil is obtained which however is so thin that it can be well cleansed by washing with water and can be obtained approximately free of ash. The oil is a mixture of the theoretically possible isomeric polyalcohols and it contains, if the production is cautiously performed, nearly no resinous ingredients. If the reaction temperature be unsuitably high, then resinous bodies will be formed which give a higher viscosity to the final product. The yield is a quantitative one. By-products are not formed at all. Part of the formed alcohols remain dissolved in the washing waters.

Where more than 2 molecules of formaldehyde are employed for 1 molecule phenol, further quantities of formaldehyde are combined, higher alcohols being formed thereby, and with certain conditions of working, mixtures of polyalcohols can be obtained which are perfectly free of unbound phenols and therefore are especially suitable for such purposes where an even small proportion of phenols is disadvantageous either in consequence of its chemical and physical properties or in consequence of its strong smell. But the other physical characteristics of the final products do not considerably differ from those of the above described products. Chemically they distinguish from them by a higher proportion of formaldehyde which can be split off.

*Example 3.*

1 gram-molecule of diphenylol ethane obtained by condensation of phenol with acetaldehyde and having the melting point 120° to 122° C. and all other properties of this known compound (see Beilstein 3rd edition volume 2 page 994) is dissolved in that quantity of 10% caustic soda solution which is necessary for forming the solution, then this solution is gradually added to 4 gram-molecules of aqueous formaldehyde (30%) and the mass is allowed to stand for 2 days at the temperature of the room. Towards the end of this time cooling may be used to prevent the oil from becoming thicker than desired, in consequence of too strong an elevation of temperature during the reaction. The condensation product is precipitated by an acid in the above described manner. It is an oil which is made somewhat turbid by water and looks like an emulsion.

*Example 4.*

1 gram-molecule of diphenylol propane, or as it is sometimes termed, dihydroxy-diphenyl-dimethyl-methane, obtained by condensation of crystallized phenol with acetone in the presence of hydrochloric acid and having the melting point 151° to 153° C. and all other properties of this known compound is brought into reaction in the manner indicated in Example 1 with formaldehyde, but double the quantity thereof, i. e. 4 gram-molecules are used because of the fact that two phenol rings are present in each molecule of the compound. The further treating is performed as indicated in Example 1 by precipitating the formed thin oil and washing it with water.

*Example 5.*

1 gram-molecule of β-naphthol is dissolved in caustic solution of 10% content and then gradually added to 4 gram-molecules of formaldehyde. Large quantities of crystals separate out. The mixture is acidulated without regard thereto. The formed condensation product is precipitated immediately. The mother-liquor still contains about 1 gram-molecule of formaldehyde so that there must be bound about 3 gram-molecules thereof. The powder shows a decomposing point of 185° C. At the same time melting and development of formaldehyde takes place.

*Example 6.*

1 gram-molecule of phenol is added progressively by degrees as indicated in Example 1 to 2 gram-molecules of acetaldehyde at the temperature of the room, or while slightly heating. The reaction product is insoluble in water; it is washed several times with water and then is found to be a thin oil having an agreeable odour which suggests the presence of acetaldehyde. When heating the product delivers considerable quantities of acetaldehyde.

*Example 7.*

1 gram-molecule of crystallized carbolic acid is dissolved with the just required quantity of a caustic soda solution of about 10% content and then added at once to 6 gram-molecules of watery formaldehyde (30%).

The mass is allowed to stand during 5 to 10 days at the temperature of the room and the formed product then is precipitated by means of a weak acid as for instance carbonic acid, acetic acid, formic acid or the like while adding water. As the condensation product formed is readily soluble in water, it is advisable to concentrate the liquid before or after the acidulation at atmospheric pressure or in vacuo and to accelerate and to improve the separation of the oil by an addition of common salt. If there have been used only very small quantities of alkali and if no special value is attached to the final product being free of alkali, the liquid may also be concentrated without acidulating it or the watery solution may also immediately be employed for further treatment.

The obtained final product when freed as much as possible from the water is a thin brown oil. It gives off great quantities of formaldehyde when heated. Before heating it is soluble in alcohol of any kind, acetone, acetic ester and similar solvents. According to analysis it contains at least two and a half molecules of formaldehyde combined in the form of alcohol groups per molecule of phenol.

*Example 8.*

1 gram-molecule of m-cresol is added to 6 gram-molecules of formaldehyde in the manner indicated in Example 7. The reaction is finished after one day at the temperature of the room. The liquid is treated in the manner explained above, and a thinly liquid oil is obtained which may easily and rapidly be cleansed by washing with water. The oil consists almost completely of polyalcohols and contains practically no resinous materials.

*Example 9.*

1 gram-molecule of crystallized carbolic acid is dissolved by means of an excess of barium hydroxide in 6 gram-molecules of aqueous formaldehyde, and the mass is allowed to stand for 5 to 10 days. Then the barium is precipitated by means of sulphuric acid or carbonic acid, the barium sulphate or carbonate respectively is filtered off, and the formed solution is concentrated in vacuo until the desired consistency is attained. A thin oil is thus obtained which easily and perfectly dissolves in water, alcohol, acetone and similar solvents and in other respects has the properties of the product described in Example 7.

The foregoing examples show that our invention is applicable to both mono- and dicyclic phenols; and we intend to include both forms of material in the term "phenol body."

Having now particularly described and ascertained the nature of our said invention, we declare that what we claim is:—

1. The method of making condensation products of the type described from phenol bodies and aldehydes which consists in dissolving a phenol body in an alkaline solvent and then adding the solution to such quantities of an aldehyde that an excess of the latter will be present during the reaction.

2. A method of making condensation products of the type described from phenol bodies and aldehydes which consists in dissolving a phenol body with just the required quantity of alkali in water and then adding the solution to such quantities of an aldehyde that an excess of the latter will be present during the reaction.

3. A method of making condensation products of the type described from phenol bodies and aldehydes which consists in dissolving a phenol body in an alkaline solvent and then adding the solution to such quantities of an aldehyde that an excess of the latter will be present during the reaction while cooling the reaction mixture.

4. A method of making condensation products of the type described from phenol bodies and aldehydes which consists in gradually adding small portions of the phenol body in an alkaline solution to an aldehyde while cooling the reaction mixture.

5. A method of making condensation products of the type described from phenol bodies and aldehydes which consists in gradually adding the phenol body in an alkaline solution in small portions to an aldehyde, the quantity of the phenol body to be employed being such that at least 1½ molecules of the aldehyde are used for treating 1 molecule of the phenol body.

6. A product of condensation of a phenol body and aldehydes in the presence of an alkaline medium being a phenol polyalcohol free of uncombined phenols.

In testimony whereof we have hereunto set our hands.

AUGUST AMANN.
EWALD FONROBERT.